Patented Dec. 20, 1927.

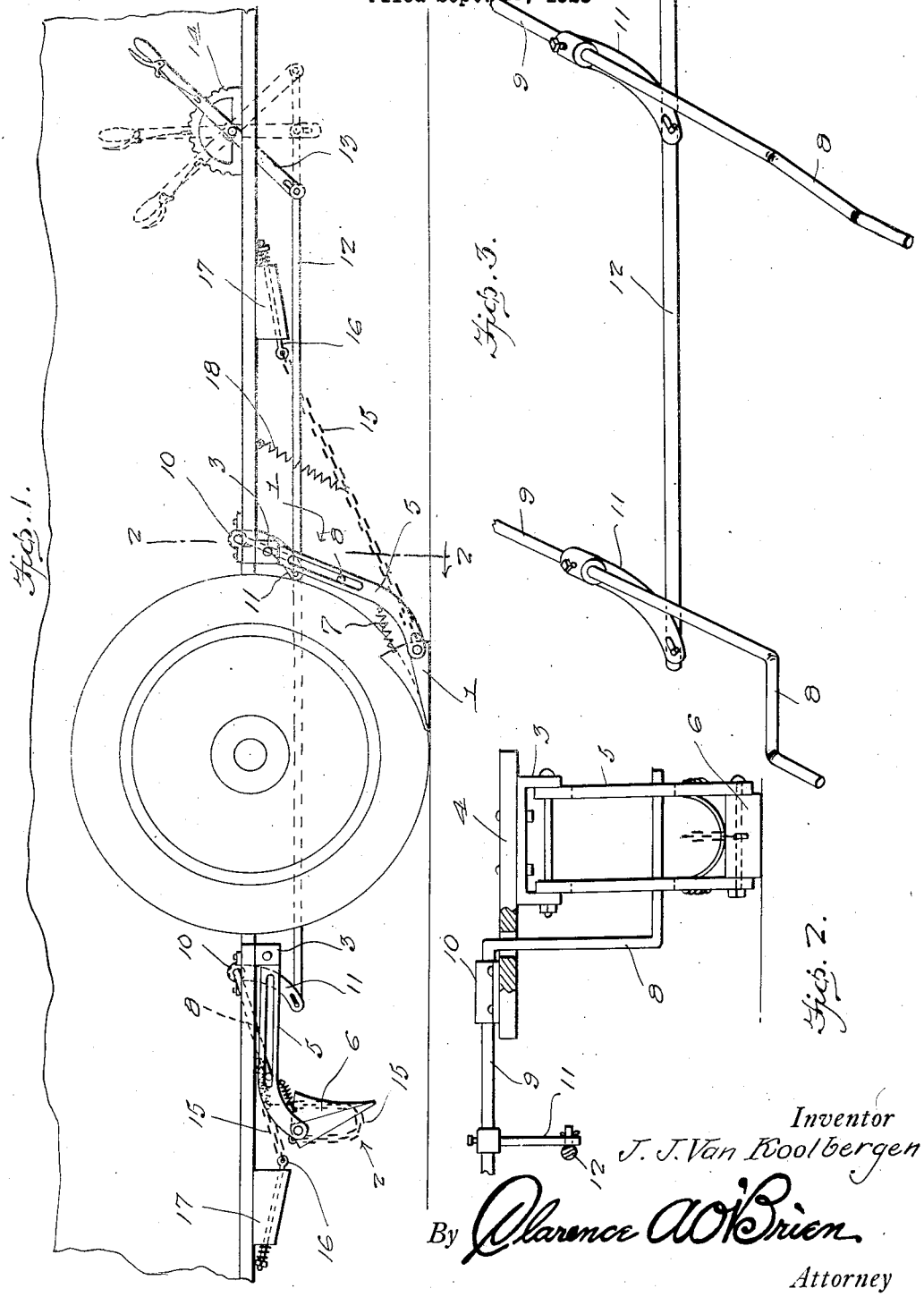

1,653,420

UNITED STATES PATENT OFFICE.

JOHN J. VAN KOOLBERGEN, OF RIDGEFIELD PARK, NEW JERSEY.

VEHICLE CHECK.

Application filed September 15, 1926. Serial No. 135,578.

This invention relates to an improved device which may be briefly entitled a vehicle check, the same having more particular reference to a supplemental and emergency brake device adapted to be brought into play for bringing the vehicle to a dead stop in case the emergency brakes fail to hold.

Briefly, the invention has reference to a pair of wheel chocks arranged on front and rear sides of the wheel so that they may be alternately operated according to the direction and movement of the vehicle, together with pivotally mounted carriers therefor, and operating means for simultaneously and alternately operating said wheel chocks.

Other features and advantages of the invention will become apparent from the following description and drawing.

Figure 1 is a side view of a vehicle check apparatus constructed in accordance with the invention showing the manner in which the same is applied.

Fig. 2 is a section taken approximately upon the plane of the line 2—2 of Fig. 1.

Fig. 3 is a detail perspective view.

As before indicated, the apparatus includes two separate devices, one for checking forward movement and one for checking rearward movement. One device is represented generally by the reference character 1 and the other one by the reference character 2. The devices, however, are identical in construction, but are mounted to operate alternately. It is believed, in view of the circumstances, that a description of one device will serve to cover both. To this end, and by referring to Fig. 2 it will be seen that the reference character 3 embodies an inverted U-shaped bracket supported by means for the body of the vehicle adjacent the periphery of the wheel. A carrier frame 5 is pivotally suspended from this bracket and at its bottom it is provided with the pivotally mounted wheel chock 6. This chock is in the form of a tapered block which may be of sectional construction or in one solid piece. The same is substantially flat on its bottom to engage the ground and has its upper side provided with a seat for reception of the tire of the vehicle wheel. As shown in Fig. 1 a small coil spring 7 serves to aid in maintaining this block or chock in place. In connection with the frame it will be noted that the same is provided with elongated slots and a crank 8 has one end portion extending into and slidable in these slots. This crank is carried by a rock shaft 9 journaled in a bearing 10, there being a rocker arm 11 on the shaft. The rocker arm is of appropriate curvature as shown better in Fig. 3. An operating push rod 12 is connected with the two rocker arms, so that a single rod serves to operate both devices. This rod is connected with an operating lever 13 as shown in Fig. 1, the lever being associated with a gear segment 14 and the lever being provided with a dog for holding the same in different set positions as indicated in this figure.

Attention may also be called to chains 15 which are connected at their lower ends with the chock and at their opposite ends with a spring pressed bolt 16 carried on an appropriate mounting 17. In addition, another coiled spring 18 is connected with the central portion of each chain and with the chassis frame of the vehicle body. The purpose of the coiled spring is to maintain the chain 15 comparatively taut and to aid in the return of the chock to ineffective position.

From the foregoing it will be seen that there are two carrier frames for pivotally mounted chocks mounted on opposite sides of vehicle wheels to operate in unison, but alternately. A single operating member is provided, and means is employed for holding it in set position. When the device is operated as shown in Fig. 1, it acts as an emergency stop for preventing movement of the vehicle in a direction from left to right. However, the lever may be swung to the opposite dotted line position and the other chock or check brought into place to prevent movement in the opposite direction.

It is well known that devices of this class constitute novel emergency devices to operate in case the ordinary brakes fail to function. It is believed that the construction and operation will be clear from the description and drawing. Consequently, a more lengthy description is thought unnecessary.

I claim:

1. In a structure of the class described, a pair of pivotally mounted carrier frames adapted for disposition on opposite sides of a vehicle wheel, pivotally mounted chocks carried by said frames, spaced parallel rock shafts for operating said frames, rocker arms carried by said shafts, a single pushrod connected with said rocker arms, and an operating lever for said push rod.

2. In a structure of the class described, a pair of pivotally mounted carrier frames adapted for disposition at substantially diametrically opposite points of a vehicle wheel, a pivotally mounted chock carried by each frame, the arms of said frame being provided with elongated slots, a pair of spaced parallel rock shafts having cranks formed at their outer ends, the horizontal portions of the cranks extending through the slots in the arms of said frame, rocker arms carried by said rock shafts, and a single push rod pivotally connected with said rock arms for causing simultaneous oscillation of the rock shafts.

In testimony whereof I affix my signature.

JOHN J. VAN KOOLBERGEN.